United States Patent
Buerk et al.

(10) Patent No.: US 8,773,053 B2
(45) Date of Patent: Jul. 8, 2014

(54) METHOD FOR OPERATING AN ELECTRIC MOTOR

(71) Applicant: Kaltenbach & Voigt GmbH, Biberach (DE)

(72) Inventors: Richard Buerk, Alberweiler (DE); Thomas Bischof, Illerbeuren (DE)

(73) Assignee: Kaltenbach & Voigt GmbH, Biberach (DE)

( * ) Notice: Subject to any disclaimer, the term of this patent is extended or adjusted under 35 U.S.C. 154(b) by 0 days.

(21) Appl. No.: 14/014,055

(22) Filed: Aug. 29, 2013

(65) Prior Publication Data
US 2014/0001989 A1      Jan. 2, 2014

Related U.S. Application Data

(63) Continuation of application No. 12/597,232, filed as application No. PCT/EP2008/002941 on Apr. 14, 2008, now Pat. No. 8,547,042.

(30) Foreign Application Priority Data

Apr. 27, 2007   (DE) .................. 10 2007 020 068

(51) Int. Cl.
*H02P 6/12*           (2006.01)

(52) U.S. Cl.
USPC ............... 318/400.15; 318/400.23; 318/430; 318/434

(58) Field of Classification Search
USPC .......... 318/400.15, 400.02, 400.04, 430, 432, 318/648, 434, 400.23
See application file for complete search history.

(56) References Cited

U.S. PATENT DOCUMENTS

| | | | | |
|---|---|---|---|---|
| 3,206,549 A | * | 9/1965 | Bahring | 388/820 |
| 3,812,411 A | * | 5/1974 | Johnson et al. | 318/376 |
| 3,867,678 A | * | 2/1975 | Stoner | 318/432 |
| 4,069,985 A | | 1/1978 | Lohest et al. | |
| 4,384,244 A | * | 5/1983 | Matsumoto | 318/803 |
| 5,251,588 A | * | 10/1993 | Tsujii et al. | 123/142.5 R |
| 5,368,116 A | * | 11/1994 | Iijima et al. | 180/65.245 |

(Continued)

FOREIGN PATENT DOCUMENTS

| | | |
|---|---|---|
| DE | 199 13 325 A1 | 11/1999 |
| DE | 10 2004 045 348 B3 | 3/2006 |

(Continued)

OTHER PUBLICATIONS

International Search Report for Application No. PCT/EP2008/002941 dated Sep. 11, 2008.

(Continued)

*Primary Examiner* — Paul Ip
(74) *Attorney, Agent, or Firm* — Marshall, Gerstein & Borun LLP

(57) ABSTRACT

A method and device for determining the motor moment constant $k_M$ of an electric motor by measuring motor parameters on the running motor. For reduction of the previously considerable measuring effort it is proposed that firstly the generator voltage $U_{EMK}$ produced by the motor is measured, and in that the motor moment constant $k_M$ is calculated by division of the generator voltage $U_{EMK}$ and the speed of rotation $f_{Mot}$ of the motor, taking into consideration at least one further constant. The method and the device are suitable for DC motors and for 3-phase synchronous motors.

15 Claims, 1 Drawing Sheet

(56) References Cited

U.S. PATENT DOCUMENTS

| | | | |
|---|---|---|---|
| 5,629,596 A * | 5/1997 | Iijima et al. | 318/762 |
| 5,747,959 A * | 5/1998 | Iijima et al. | 318/762 |
| 5,828,199 A * | 10/1998 | Tajima et al. | 318/779 |
| 6,087,791 A | 7/2000 | Maruyama | |
| 6,127,820 A * | 10/2000 | Kessler et al. | 324/177 |
| 6,320,338 B1 * | 11/2001 | Kang | 318/430 |
| 6,693,406 B2 * | 2/2004 | Korssell et al. | 318/806 |
| 7,199,540 B2 * | 4/2007 | Yaguchi | 318/432 |
| 7,342,378 B2 * | 3/2008 | Sakamoto et al. | 318/717 |
| 2004/0100219 A1 * | 5/2004 | Kerner et al. | 318/648 |
| 2004/0145355 A1 | 7/2004 | Taniguchi | |
| 2006/0076914 A1 * | 4/2006 | Yaguchi | 318/432 |
| 2006/0267531 A1 | 11/2006 | Hahn | |
| 2007/0120519 A1 * | 5/2007 | Sakamoto et al. | 318/722 |
| 2009/0039814 A1 * | 2/2009 | Rosch | 318/434 |
| 2009/0055055 A1 * | 2/2009 | Schussler et al. | 701/49 |
| 2009/0140674 A1 * | 6/2009 | Nakatsugawa et al. | 318/400.02 |
| 2009/0167222 A1 | 7/2009 | Blind et al. | |
| 2010/0060213 A1 * | 3/2010 | Hasegawa | 318/400.04 |
| 2010/0117575 A1 * | 5/2010 | Burk et al. | 318/400.15 |
| 2010/0134053 A1 | 6/2010 | Yamada et al. | |
| 2010/0270961 A1 * | 10/2010 | Schanzenbach et al. | 318/430 |
| 2010/0319268 A1 * | 12/2010 | Bizard | 49/506 |

FOREIGN PATENT DOCUMENTS

| | | |
|---|---|---|
| EP | 1 758 239 A2 | 8/2006 |
| WO | WO-2007071520 A1 | 6/2007 |
| WO | WO-2007/090760 A2 | 8/2007 |

OTHER PUBLICATIONS

DC Motor Calculation, by Faulhaber Group, Micro Mo Electronics, Inc. No Date http://vvvvw.me.mtu.edu/~wjendres/ProductRealization1Course/DC_Motor_Calculations.pdf.

Motorparameters.No Date.

Torque Equation of DC Motor—Electrical Engineering. No date.

* cited by examiner

METHOD FOR OPERATING AN ELECTRIC MOTOR

CROSS-REFERENCE TO RELATED APPLICATIONS

This is a continuation of U.S. application Ser. No. 12/597,232, which is the U.S. national phase of international application no. PCT/EP2008/002941 filed Apr. 14, 2008, which in turn claims convention priority based on German application no. 102007020068.6 filed Apr. 27, 2007, the respective disclosures of which are hereby incorporated by reference.

TECHNICAL FIELD

The invention relates to a method and a device for the determination of the motor constant of an electric motor by measuring motor parameters on the running motor.

BACKGROUND

To date in electronic motor controls there are used for the motor moment regulation and/or motor moment restriction motor moment constants $k_M$. With the aid of this relationship:

$$M_{Mot} = k_M \cdot I_{Mot} \quad (1)$$

the produced inner motor moment (without friction losses, therefore inner moment) can be determined on the basis of the measured or regulated motor current $I_{Mot}$.

As a rule, thereby the motor moment constant is determined by measurement techniques over a statistically sufficient number of motors on a motor test bed and then stored as constant in the motor control.

For the determination of the motor moment constant there is employed as a rule a torque measurement device and a current measurement device and the motor moment constant is then calculated via the formula $$k_M = \frac{M_{Mot}}{I_{Mot}} \quad (2)$$

It is here clear that a great measuring outlay is necessary for the determination of the motor moment constants and only (depending on application) a mean, maximum or minimum value of the motor moment constant can be employed for the motor control, insofar as no calibration is carried out for each motor.

SUMMARY

The embodiments described herein reduce the measuring effort for the determination of the motor moment constant. Furthermore the possibility is to be opened up of making a self-calibrating motor control possible.

The embodiments described herein provide a method for determining the motor moment constant $k_M$ of an electric motor by measuring motor parameters on the running motor, characterized in that, the motor moment constant $k_M$ for a DC motor and for a 3-phase synchronous motor is determined by calculation from the generator voltage $U_{EMK}$ produced by the motor and the speed of rotation $f_{Mot}$ of the motor. The embodiments described herein further provide a device for determining the motor moment constant $k_M$ of an electric motor, comprising (a) measurement means for the generator voltage $U_{EMK}$ produced by the motor, (b) measurement means for the speed of rotation $f_{Mot}$ of the motor, and (c) a computer to which the measurement results of the measurement means are delivered and which calculates the motor moment constant $k_M$ therefrom.

In some embodiments, the generator voltage $U_{EMK}$ produced by the motor is measured, and the motor moment constant $k_M$ is calculated according to the following formulae.

For a DC motor $$k_M = \frac{U_{EMK}}{2\pi \cdot f_{Mot}} \quad (3)$$

and for a 3-phase synchronous motor $$k_M = \frac{U_{EMK}}{2\pi \cdot f_{Mot}} \cdot \sqrt{3} \quad (4)$$

The above formulae arise as follows:
There applies:

$$P_{Mech} = M \cdot \omega \quad (5)$$

Where $P_{Mech}$ is the mechanical motor power, M the motor moment and $\omega$ the angular frequency.

There applies further for an ideal loss-free DC motor $$P_{el} = U_{EMK} \cdot I_{Mot} \quad (6)$$

and for an ideal loss-free 3-phase synchronous motor $$P_{el} = U_{EMK,phph} \cdot I_{Mot} \cdot \sqrt{3} \quad (7)$$

Where $P_{el}$ is the electrical motor power, $U_{EMK}$ the generator voltage produced by the motor and $I_{Mot}$ the generator current produced by the motor.

There further applies for both motor types $$P_{Mech} = P_{el} \quad (8)$$

Equating formulae (5) and (6) one then obtains for the DC motor $$U_{EMK} \cdot I_{Mot} = M \cdot 2\pi \cdot f_{Mot} \quad (9)$$

And equating formulae (5) and (7) for the 3-phase synchronous motor $$U_{EMK,phph} \cdot I_{Mot,phph} \cdot \sqrt{3} = M \cdot 2\pi \cdot f_{Mot} \quad (10)$$

in which $f_{Mot}$ is the speed of rotation of the motor which also is described as revolution frequency or rotational frequency. The speed of rotation is a physical parameter with the dimension 1/time. As a rule, it is indicated for motors as revolutions/minute.

From formula (9) there is provided for the DC motor:

$$M = \frac{U_{EMK}}{2\pi \cdot f_{Mot}} \cdot I_{Mot} \quad (11)$$

From formula (10) there is provided for the 3-phase synchronous motor $$M = \frac{U_{EMK,phph}}{2\pi \cdot f_{Mot}} \cdot I_{Mot,phph} \cdot \sqrt{3} \quad (12)$$

If one combines formulae (2) and (11), formula (3) thus arises.

If one combines formulae (2) and (12) and sets cos phi=1, formula (4) arises. Both could be proven.

Some embodiments are directed specifically to DC motors and 3-phase synchronous motors in that, the generator voltage $U_{EMK}$ produced by the motor is measured and in that the motor moment constant is $k_M$ is calculated according to the following formulae:

For the DC motor:

$$k_M = \frac{U_{EMK}}{2\pi \cdot f_{Mot}}$$

For the 3-phase synchronous motor:

$$k_M = \frac{U_{EMK}}{2\pi \cdot f_{Mot}} \cdot \sqrt{3}$$

For the DC motor, before measuring the generator voltage $U_{EMK}$ the externally driven motor is brought to a predetermined speed of rotation $f_{Mot}$ which is used for the calculation. Also for the DC motor, before measuring the motor is started by applying an operating voltage, the operating voltage then is switched off, and the generator voltage $U_{EMK}$ is measured after the inductive operating current fades away and at the same time the speed of rotation $f_{Mot}$ is measured via an external speed of rotation measuring device. For a 3-phase synchronous motor, the motor is started by applying an operating voltage, and the operating voltage is then switched off and after the inductive operating current fades away, the generator In some embodiments for a DC motor, the externally driven motor is taken to a predetermined speed of rotation before measuring the generator voltage, which is then used for the calculation of the motor moment constant. With this embodiment, the speed of rotation is fixed and need not be measured first; only the generator voltage produced by the motor must still be measured.

In other embodiments, also for a DC motor, an operating voltage is applied to start the motor before measuring. The operating voltage is then switched off, and the generator voltage is measured after the inductive operating current fades away and at the same time the speed of rotation is measured via an external speed of rotation measuring device. In this embodiment, an external speed of rotation measuring device is also required besides the measuring device for the generator voltage; however, the external drive is not needed.

In further embodiments for a 3-phase synchronous motor, initially the motor is started without load by applying an operating voltage, the operating voltage is then switched off and after the inductive operating current fades away the generator voltage is measured, wherein the speed of rotation is provided from the cycle duration of the generator voltage produced. With this variant there is likewise needed only a measurement device for the generator voltage since the rotational frequency, as mentioned, is provided from the cycle duration of the produced generator voltage.

With none of the above described variants is a torque measurement device still required, which previously was necessary in every case and in equipment technology terms is rather complex.

To be able to realize highly exact moment control, the open-circuit current must be determined. This open-circuit current contains motor internal losses (e.g. relating to magnetization and friction losses) which then take part as offset in the calculation of the motor moment.

An intelligent control can be realized with which the connected motor can be measured so that it is then able to deliver very exactly the desired moment. Through this a calibration with an external moment test device can be forgone in most cases.

BRIEF DESCRIPTION OF THE DRAWINGS

Exemplary embodiments will be described below with reference to the drawings. There is shown.

DETAILED DESCRIPTION

Figure 1:
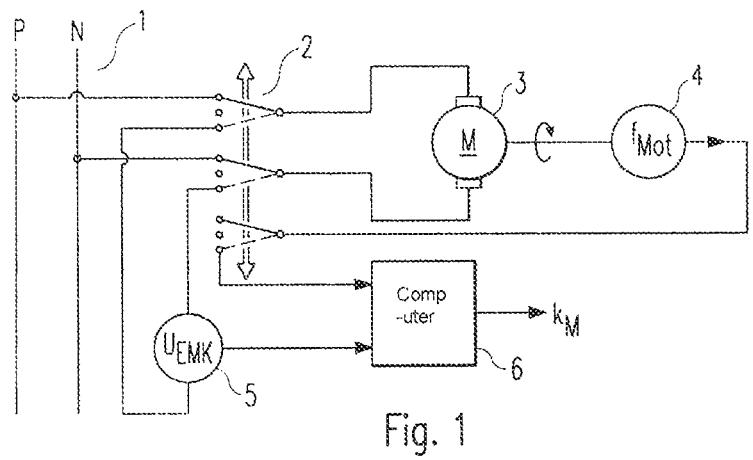
FIG. 1 a circuit for the determination of the motor moment constant of a DC motor.

In FIG. 1 a DC motor 3 is provided with operating voltage from a DC current supply system 1 via a double-throw switch 2. The DC motor 3 is started in the illustrated switching position of the double-throw switch 2. A speed of rotation measuring device 4 sits on the motor shaft of the DC motor 3, with which the speed of rotation $f_{Mot}$ of the DC motor 3 can be determined.

After the DC motor 3 has started, at first it is separated from the DC current supply system 1 with the double-throw switch 2 until the inductive operating current has faded away. The double-throw switch 2 is then switched over into the switching position indicated by broken lines. In this switching position a voltage measurement device 5 is connected with the terminals of the DC motor 3 which measures the generator voltage $U_{EMK}$ of the motor 3. The measurement result is delivered to a computer 6. The measurement result of speed of rotation measuring device 4 is further delivered to the computer 6 via the double-throw switch 2. The computer 6 determines the motor moment constant $k_M$ from the generator voltage $U_{EMK}$ and from the speed of rotation $f_{Mot}$ by division according to the formula (3) given previously.

Figure 2:
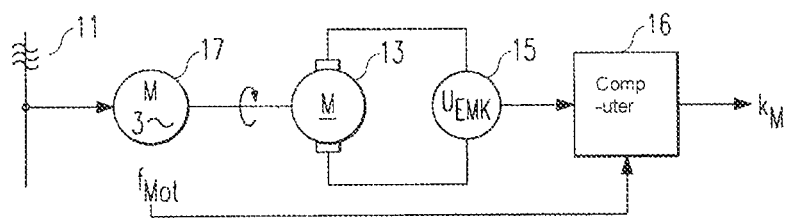
FIG. 2 an alternative circuit to FIG. 1 for the determination of the motor moment constant.

With the embodiment shown in FIG. 2 the DC motor 13 is started not through its own force but by means of a mechanical coupling with an auxiliary motor 17 which in the present case is a 3-phase AC motor which is fed by a 3-phase AC network 11. Since the 3-phase AC network has a fixed known frequency, this can be delivered to a computer 16. In addition, there is supplied to the computer 16 a value of the generator voltage which is determined by a voltage measuring device 15, wherein the voltage measuring device 15 is connected to the electrical terminals of the DC motor 13. In turn the computer 16 calculates, through division of the generator voltage $U_{EMK}$ and the speed of rotation $f_{Mot}$ of the motor according to the formula (3) given previously, the motor moment constant $k_M$.

Figure 3:
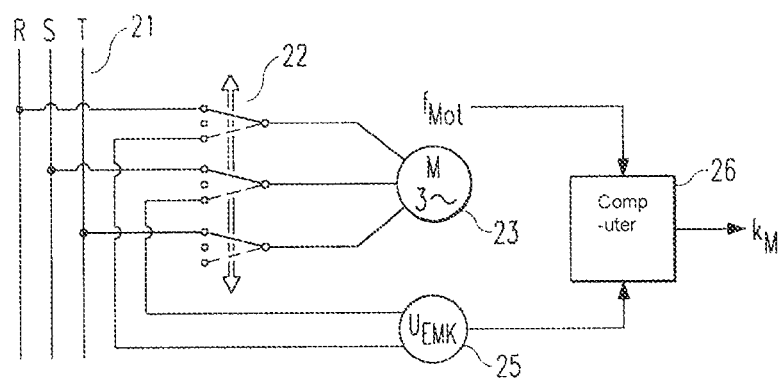
FIG. 3 a circuit for the determination of the motor moment constant of a 3-phase synchronous motor.

The circuit shown in FIG. 3 for the determination of the moment constant $k_M$ is designed for a 3-phase synchronous motor 23. This is firstly connected via a double-throw switch 22 to a 3-phase AC network 21. After the motor 23 has started and has reached its synchronous speed of rotation, the double-throw switch 22 is firstly switched over into the middle position in which the motor 23 is separated from the network 21. The double-throw switch 22 remains in this position until the inductive operating current in the motor 23 has faded away. The double-throw switch 22 is then switched over into the lower switching position indicated by broken lines. In this switching position two of the three terminals of the motor 23 are connected with a voltage measurement device 25 which measures the generator voltage 25 produced by the now idling motor 23 and delivers the result to a computer 26. In addition, there is delivered to the computer 26 as further value the speed of rotation of the motor which is known from the construction of the motor 23 and the frequency of the 3-phase AC network 21. The computer then calculates from the values delivered thereto the motor moment constant $k_M$ by division according to the formula (4) given previously.

With the measuring means for the generator voltage of the motor and its speed of rotation, and the device containing the computer for the determination of the motor moment constants $k_M$, motor control electronics can be realized which can automatically measure the motors in accordance with the described method. In this way production variations of the motor can compensated and a very exact moment control be realized without a calibration being required. However, the device finds application not only in production but also in the laboratory in order to measure the motors without a complex test bed being necessary.

Furthermore there is also the possibility of integrating the device in accordance with the invention into a motor control which measures the connected motor, as described above, and uses the measurement results—that is, the motor moment constant here obtained—for the more exact control of the motor, in particular for a control/regulation of the torque.

The invention claimed is:

1. A method for determining properties of an electric motor by measuring motor parameters of the electric motor, comprising:
   accelerating the electric motor to a speed of rotation $f_{Mot}$ by applying an operating voltage;
   after the accelerating step, switching off the operating voltage;
   after the step of switching off the operating voltage, allowing an inductive operating current of the motor to fade away;
   after the step of allowing the operating current to fade away, determining a generator voltage $U_{EMK}$ produced by the electric motor as the electric motor rotates, and determining the speed of rotation $f_{Mot}$; and
   determining a motor torque constant $k_M$ for the electric motor using the produced generator voltage $U_{EMK}$ and speed of rotation $f_{Mot}$.

2. A method according to claim 1, wherein the motor comprises a DC motor, and wherein the determining step comprises calculating the motor torque constant $k_M$ according to the following formula:

$$k_M = \frac{U_{EMK}}{2\pi \cdot f_{Mot}}$$

3. A method according to claim 2, wherein the motor comprises a 3-phase synchronous motor, and wherein the determining step comprises calculating the motor torque constant $k_M$ according to the following formula $$k_M = \frac{U_{EMK}}{2\pi \cdot f_{Mot}} \cdot \sqrt{3}$$

4. A method according to claim 1, wherein the step of determining the generator voltage $U_{EMK}$ comprises determining the generator voltage with essentially no current flowing through the electric motor.

5. A method according to claim 1, further comprising, after the accelerating step, determining the speed of rotation $f_{Mot}$.

6. A method according to claim 5, wherein the motor is a DC motor, and wherein the step of determining the speed of rotation $f_{Mot}$ comprises measuring the speed of rotation $f_{Mot}$ via an external speed of rotation measuring device.

7. A method according to claim 5, wherein the motor is a 3-phase synchronous motor, and wherein the step of determining the speed of rotation $f_{Mot}$ comprises measuring a cycle duration of the generator voltage $U_{EMK}$.

8. A device for determining properties of an electric motor by measuring motor parameters of the electric motor, comprising:
   (a) means for accelerating the electric motor to a speed of rotation $f_{Mot}$, comprising means for applying an operating voltage;
   (b) means for switching off the operating voltage and allowing an inductive operating current of the motor to fade away; and
   (c) means for determining a generator voltage $U_{EMK}$ produced by the electric motor as the electric motor rotates at the speed of rotation $f_{Mot}$ and after the operating current fades away;
   (d) means for determining the speed of rotation $f_{Mot}$ of the rotating motor; and
   (e) a computer configured to receive results from both determining means and to calculate a motor torque constant $k_M$ from the results.

9. A device according to claim 8, wherein the device is configured to determine the generator voltage $U_{EMK}$ when the motor rotates at the speed of rotation $f_{Mot}$.

10. A device according to claim 9, wherein the motor comprises a DC motor, and wherein the computer is further configured to calculate the motor torque constant $k_M$ according to the following formula.

$$k_M = \frac{U_{EMK}}{2\pi \cdot f_{Mot}}$$

11. A device according to claim 9, wherein the motor comprises a 3-phase synchronous motor, and the computer is further configured to calculate the motor torque constant $k_M$ according to the following formula.

$$k_M = \frac{U_{EMK}}{2\pi \cdot f_{Mot}} \cdot \sqrt{3}$$

12. A device according to claim 8, wherein the means for determining the generator voltage $U_{EMK}$ comprises means for determining the generator voltage with essentially no current flowing through the electric motor.

13. A device according to claim 8, further comprising means for determining the speed of rotation $f_{Mot}$ after the motor has been accelerated.

14. A device according to claim 13, wherein the motor is a DC motor, the device further comprising an external speed of rotation measuring device.

15. A device according to claim 13, wherein the motor is a 3-phase synchronous motor, and wherein the means for determining the speed of rotation $f_{Mot}$ of the motor comprises means for measuring a cycle duration of the generator voltage $U_{EMK}$.

* * * * *